US011645828B2

(12) United States Patent
Wagner et al.

(10) Patent No.: US 11,645,828 B2
(45) Date of Patent: May 9, 2023

(54) METHOD AND DEVICE FOR ASCERTAINING AN EXPLANATION MAP

(71) Applicant: Robert Bosch GmbH, Stuttgart (DE)

(72) Inventors: Joerg Wagner, Renningen (DE); Tobias Gindele, Zürich (CH); Jan Mathias Koehler, Stuttgart (DE); Jakob Thaddaeus Wiedemer, Laichingen (DE); Leon Hetzel, Werther (DE)

(73) Assignee: ROBERT BOSCH GMBH, Stuttgart (DE)

( * ) Notice: Subject to any disclaimer, the term of this patent is extended or adjusted under 35 U.S.C. 154(b) by 220 days.

(21) Appl. No.: 17/261,758

(22) PCT Filed: Jul. 3, 2019

(86) PCT No.: PCT/EP2019/067841
§ 371 (c)(1),
(2) Date: Jan. 20, 2021

(87) PCT Pub. No.: WO2020/025245
PCT Pub. Date: Feb. 6, 2020

(65) Prior Publication Data
US 2021/0342653 A1 Nov. 4, 2021

(30) Foreign Application Priority Data
Aug. 3, 2018 (DE) .................... 10 2018 213 056.6

(51) Int. Cl.
*G06V 10/44* (2022.01)
*G06F 18/2413* (2023.01)
(Continued)

(52) U.S. Cl.
CPC .......... *G06V 10/454* (2022.01); *G06F 18/213* (2023.01); *G06F 18/24133* (2023.01); *G06V 10/764* (2022.01); *G06V 10/82* (2022.01)

(58) Field of Classification Search
CPC .............. G06K 9/6271; G06K 9/6232; G06V 10/454; G06V 10/764; G06V 10/82; G06V 2201/03
See application file for complete search history.

(56) References Cited

U.S. PATENT DOCUMENTS

| 11,475,658 B2* | 10/2022 | Ebrahimpour .......... G06F 17/15 |
| 2002/0142522 A1* | 10/2002 | Pnueli .................... H01L 22/20 |
| | | 257/E21.525 |
| 2006/0009700 A1* | 1/2006 | Brumfield ............ A61B 5/6838 |
| | | 600/587 |

(Continued)

FOREIGN PATENT DOCUMENTS

DE 102018205561 A1 2/2019

OTHER PUBLICATIONS

International Search Report for PCT/EP2019/067841, dated Nov. 14, 2019.
(Continued)

*Primary Examiner* — Santiago Garcia
(74) *Attorney, Agent, or Firm* — Norton Rose Fulbright US LLP; Gerard Messina

(57) ABSTRACT

A method for ascertaining an explanation map of an image, in which all those pixels of the image are changed which are significant for a classification of the image ascertained with the aid of a deep neural network. The explanation map is selected in such a way that a smallest possible subset of the pixels of the image are changed, and the explanation map preferably does not lead to the same classification result as the image when it is supplied to the deep neural network for classification. The explanation map is selected in such a way that an activation caused by the explanation map does not (Continued)

essentially exceed an activation caused by the image in feature maps of the deep neural network.

14 Claims, 2 Drawing Sheets

(51) Int. Cl.
    *G06F 18/213*     (2023.01)
    *G06V 10/764*     (2022.01)
    *G06V 10/82*     (2022.01)

(56) References Cited

U.S. PATENT DOCUMENTS

| | | | |
|---|---|---|---|
| 2016/0239979 A1* | 8/2016 | El Dokor | G06K 9/6218 |
| 2018/0018553 A1* | 1/2018 | Bach | G06N 3/02 |
| 2018/0300138 A1* | 10/2018 | Pineda de Gyvez | G06V 40/20 |
| 2019/0050368 A1* | 2/2019 | Chen | G06V 10/776 |
| 2019/0197349 A1* | 6/2019 | Yu | G06T 7/174 |
| 2019/0287238 A1* | 9/2019 | Sriraman | G06V 10/22 |
| 2019/0294106 A1* | 9/2019 | Cheng | G03H 1/0005 |
| 2020/0159904 A1* | 5/2020 | Bae | G09G 3/3208 |
| 2021/0208497 A1* | 7/2021 | Maeda | G03F 7/20 |

OTHER PUBLICATIONS

Mengnan Du et al., "Towards Explanation of DNN-Based Prediction With Guided Feature Inversion," Cornell University Library, 2018, pp. 1-10. <https://arxiv.org/pdf/1804.00506.pdf> Downloaded Jan. 20, 2021.

* cited by examiner

METHOD AND DEVICE FOR ASCERTAINING AN EXPLANATION MAP

FIELD

The present invention relates to a method for ascertaining an explanation map, a computer program, a single machine-readable storage medium or a plurality thereof and a single computer or a plurality thereof, a machine classification system as well as a display system.

BACKGROUND INFORMATION

A device for classifying a retina is described in German Patent Application No. DE 10 2018 205 561, which includes an artificial neural network having at least one convolution layer, the convolution layer containing a plurality of trainable convolution kernels and supplying an activation map for each convolution kernel, which assigns to discrete positions in the input of the at least one convolution layer an output value in each case, which is a measure of the local correspondence of the input with the particular convolution kernel, the at least one convolution layer being connected downstream from at least one classifier layer, which maps its input to a set of probabilities with the aid of trainable weights so that this input belongs to one of multiple pre-defined classes, in particular whether the tissue is healthy or pathologically altered, an evaluation unit being provided, which is designed to ascertain a relevance map of the output of the at least one convolution layer by weighted summation of the activation maps received from the at least one convolution layer with the aid of weights stored in an aggregation layer, the relevance map showing the places of the tissue which were significant for the assessment.

SUMMARY

In accordance with an example embodiment, a method in accordance with the present invention may have an advantage over the related art that an improved ascertainment of an explanation map is made possible, which permits, in particular, a pixel-precise representation. The piece of information contained in the explanation map is accessible in the first place to human perception.

Advantageous refinements of the present invention are described here.

In particular, in a system for supporting medical diagnostics, in which a possible diagnosis is determined with the aid of a deep neural network, based on certain features of an image, it is important to clearly show an attending physician which parts of the image resulted in this diagnosis.

In a first aspect, the present invention therefore relates to a method for ascertaining an explanation map of an image, i.e. the regions of an image which are significant for a classification result, the image being classified with the aid of a deep neural network (i.e., the image is assigned to a class made up of a predefinable plurality of classes), in which pixels of the image are changed depending on how significant they are for the classification of the image, the explanation map being selected in such a way that a smallest possible subset of the pixels of the image are changed, which takes place in such a way that the explanation map preferably does not lead to the same classification result as the image when it is supplied to the deep neural network for classification, the explanation map being selected in such a way that, in feature maps of the deep neural network, an activation caused by the explanation map does not then essentially exceed an activation caused by the image (i.e., when correspondingly supplied to the deep neural network).

The fact that the explanation map preferably does not lead to the same classification result as the image may mean, for example, that possible classification results are each assigned a probability, and the probability of the same classification result is minimized.

The change of the pixels may take place, for example, in such a way that all those pixels of the image are changed which are significantly indicative of the classification of the image. These pixels may be highlighted or deleted, for example.

This means that it is provided that not only the image but also the explanation map is supplied to the deep neural network, the classifications received in each case as the output variable of the deep neural network preferably not being the same.

A deep neural network is usually a neural network which includes a plurality of layers.

Due to the fact that the explanation map is created in the size of the incoming image and is not created in the size of an activation map or an output variable of a (in particular the last) convolution layer, a particularly accurate representation results, since the explanation map in the alternative approaches described would have to be scaled up to the size of the incoming image. Relevant edge and color information is retained.

In one refinement, it may be provided that the explanation map is selected in such a way that a loss function L is optimized. In other words, the provided method is based on an optimization problem including secondary conditions, i.e. for example $$s_x^* = \operatorname*{argmin}_{s_x}(L); \; s_x^{(0)} = x; \text{ where: } h^l(s_x) \leq h^l(x) \forall \, l; \qquad (1)$$

Equation (1) may be advantageously solved with the aid of a mask b, which may be, for example, multiplicative, i.e. $s_x = x \cdot b$, $b \in [0,1]$ being optimized, advantageously with the aid of a start condition $b(0)=1$. Alternatively, mask b may also be additive, i.e., $s_x = x + b$, b being optimized with the aid of start condition $b(0)=0$. If the optimized mask is designated by $b^*$, $s_x^* = x \cdot b^*$ or $s_x^* = x + b^*$ results for the solution of the optimization problem from equation (1).

In the optimization problem, an explanation map or representation 4 which meets certain properties is sought, based on an image x. These properties may be particularly easily and flexibly shown with the aid of the loss function.

The connection between image x and representation $s_x^*$ may then be defined by initial state $s_x^{(0)}$ of $s_x$ (or by a corresponding start condition of mask b) as well as by the secondary condition of the optimization. One possible specific embodiment is that representation $s_x^*$ contains only features which are also contained in image x. The initial state may thus be $s_x^{(0)}=x$, the secondary condition, which is to be advantageously met for each ReLU layer of the deep neural network, may be $h^l(s_x) \leq h^l(x)$, $h^l$ being the activation of the lth ReLU layer of the deep neural network (it also being possible, of course, to use other activation functions instead of a ReLU function).

The loss function advantageously includes multiple (additive) components, i.e. $L = L_h + L_w + L_c$. The additive components may, of course, be weighted differently by parameters, but these parameters may also be integrated into the definition of the components. When solving the optimization problem from equation (1), these weighted parameters may be optionally adapted. A first component $L_h=l_h(s_x)$ may be selected in such a way that it characterizes how many pixels of the image are changed. For example, this component may be constituted by L1 norm $l_h(s_x)=\|s_x-x\|_1$. Alternatively, this component may be used by L1 norm $\|1-b\|_1$ of multiplicative mask b for $s_x=x\cdot b$ ($b \in [0.1]$). This component would then cause all irrelevant pixels from x to be contained unchanged in $s_x$.

Alternatively or additionally, the loss function may include a second component, which characterizes how high a probability there is that the classification result which occurs for the explanation map corresponds to the classification result which occurs for the image. This may be achieved by a component $L_w=l_w(f(x|\theta), f(s_x|\theta))$, $f$ describing the deep neural network or a part of the deep neural network. Parameters of the deep neural network are designated by $\theta$. The output of the deep neural network, i.e., the classification, is designated by $f(x|\theta)$ or $f(s_x|\theta)$.

Alternatively, the second component may occur area by area, in particular pixel by pixel, due to a function which characterizes how much a particular pixel contributes to the classification result occurring for the image. This function may be constituted, for example, by a logit function $f_{logit}^i$ of a class i, so that the corresponding component of the loss function is then constituted by $l_w=f_{logit}^i(s_x|\theta)$. In other words, the second component is constituted by the probability of class i (upon minimizing the probability of class i). Alternatively, it may be constituted by a function, which determines all pixels which activate a feature i. If hi designates an ith feature map of the lth layer, the associated term of the loss function may be constituted by $l_w=\|f_l^i(s_x|\theta)\|_1$. Other norms are possible, for example an L2 norm.

The implementation of the secondary condition that the activation by the explanation map may not essentially exceed the activation by the image may be particularly easily implemented by the optimization approach using a third component $L_c$ in the loss function, which penalizes an exceeding of this type, i.e., for example $L_c=\|maximum(h^l(s_x)-h^l(x), 0)\|_1$. Other norms are possible, for example an L2 norm.

Alternatively, the meeting of this secondary condition may be achieved in that activations $h_l(s_x)$ are set to a predefinable value in the feature map during the ascertainment of the explanation map, in particular to the maximum permissible value according to the secondary condition, for example due to $h'_l(s_x)=\min(h_l(x), h_l(s_x))$. If a gradient-based optimization method is used, a corresponding gradient $\delta_l$ may then be constituted by $\delta_l'=\delta_l \cdot [h_l(s_x)<h_l(x)]$ in the backpropagation. The notation [ ... ] means as usual that the value=1, if the condition is met, and =0, if the condition is not met.

Alternatively, the meeting of the secondary condition may be achieved in that, when using the gradient-based optimization method, gradient $\delta_l$ of the backpropagation of a feature map $h_l$ of a layer having activation functions, in particular a ReLU layer, (i.e. the gradient present at the output of the activation function) of the deep neural network is set to be equal to a predefinable gradient value, in particular set to be equal to zero, if activation $h_l(s_x)$ by explanation map $s_x$ exceeds activation $h_l(x)$ by image x in the layer, i.e., for example, $\delta_l'=\delta_l \cdot [h_l(s_x)<h_l(x)]$.

The explanation map ascertained in this manner may now be advantageously ascertained and displayed, in particular next to the image. Due to the location-accurate resolution and the selection of only the irrelevant pixels, it is thus possible to generate a representation which is accessible for an examination by a human expert, in particular a physician.

Specific embodiments of the present invention are explained in greater detail below, with reference to the figures.

DETAILED DESCRIPTION OF EXAMPLE EMBODIMENTS

Figure 1:
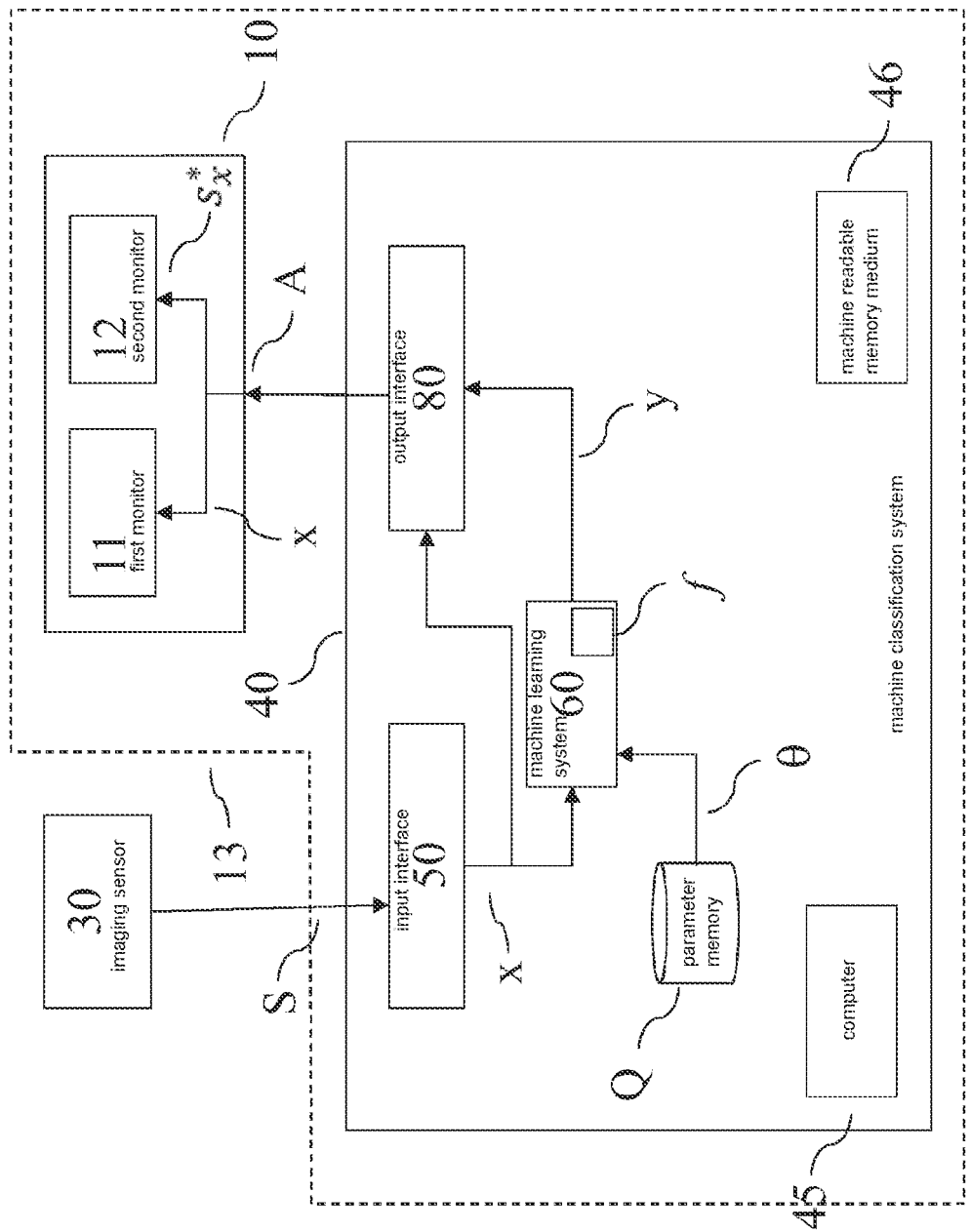
FIG. 1 schematically shows a design of specific embodiments of the present invention.

In one preferred specific embodiment of the present invention,

FIG. 1 shows a machine classification system 40, which is configured to carry out the present invention. Machine classification system 40 includes a computer 45 and a machine-readable memory medium 46. It further includes a machine learning system 60, which ascertains an output signal y from an image x supplied thereto. Image x may be ascertained, for example via an optional input interface 50, from a sensor signal S, which was ascertained by an imaging sensor 30.

The machine learning system ascertains a classification $f(x|\theta)$ of image x with the aid of a deep neural network $f$. Deep neural network $f$ is parameterized using parameters $\theta$, which are stored in a parameter memory Q. Machine learning system 60 further ascertains an explanation map $s_x^*$, for example with the aid of the method illustrated in FIG. 2. Explanation map $s_x^*$ and classification $f(x|\theta)$ together form output signal y, from which an activation signal A is ascertained together with image x, for example, with the aid of an optional output interface 80.

Activation signal A may include, for example explanation map $s_x^*$, classification $f(x|\theta)$ and image x. The activation signal is then supplied to a display unit 10, which includes, for example, two monitors 11, 12. Image x is supplied to first monitor 11 and displayed, and explanation map $s_x^*$ is supplied to second monitor 12 and displayed. Classification $f(x|\theta)$ may also be optionally displayed.

Figure 2:
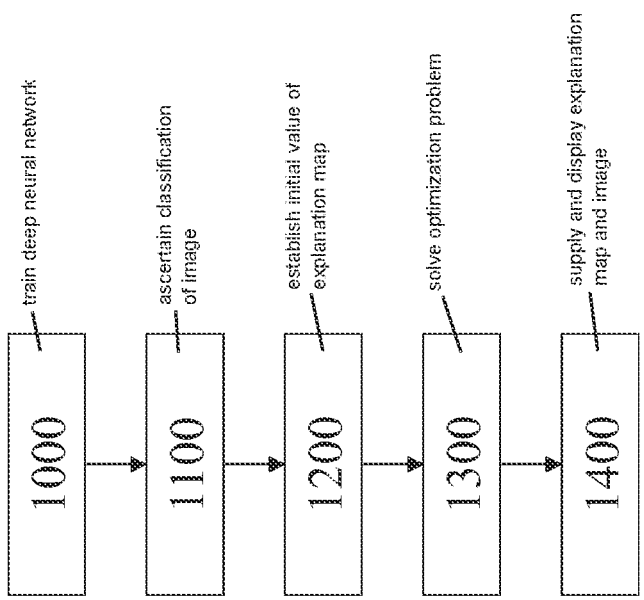
FIG. 2 shows the sequence of the method according to one aspect of the present invention in a flowchart.

FIG. 2 illustrates one specific embodiment of the method for ascertaining explanation map $s_x^*$. Deep neural network $f$ is first (1000) trained, for example to be able to discriminate between different disease patterns in images. A classification $f(x|\theta)$ of image x is then (1100) ascertained for an image x supplied to machine learning system 60 with the aid of deep neural network $f$. These steps do not necessarily have to be part of the method according to the present invention but instead determine its context and may be carried out, for example, ahead of time by separate units.

An initial value $s_x^{(0)}$ of the explanation map is subsequently (1200) established, for example, $s_x^{(0)}=x$. The optimization problem defined by a formula (1) is then (1300) solved, preferably with the aid of a gradient descent method for the purpose of determining explanation map 4.

Explanation map $s_x$ and image x are then (1400) supplied to monitors 11, 12 and displayed thereon as described. This ends the method.

In another specific embodiment, imaging sensor 30 is implemented in a manufacturing plant. The method may then be used to show rejects to a human operator via the display unit, making it possible in the first place for the operator to determine whether a reject is, in fact, present via the display on display unit 10.

In a further specific embodiment, an arbitrary image recording unit is provided instead of imaging sensor 30, which may be an imaging sensor 30 or which, for example, loads and provides images from a database. The method may then be employed to check the functional capability of deep neural network $f$ for the purpose of enabling a human developer to analyze, via the display on display unit 10, which image regions have resulted in a possible misclassification.

In yet a further specific embodiment, imaging sensor 30 is part of a monitoring system. The display on display unit 10 enables a human expert to determine whether a presumably abnormal scene detected by machine learning system 60 (for example, an unclaimed suitcase) is in fact present.

It is understood to those skilled in the art that computer 46 may also be constituted by a plurality of computers, and machine-readable memory system 45 may be constituted by a plurality of machine-readable memory media.

What is claimed is:

1. A method comprising:
    obtaining an image formed of a plurality of pixels; and
    generating an explanation map of the image that maps at least one pixel region of the image that each is categorized as significant for a classification, by a deep neural network, of the image, wherein the generating of the explanation map is performed:
        by using the deep neural network to, for each respective region of the at least one pixel region, change all of the pixels that are in the respective pixel region of the image; and
        in such a way that:
            a smallest possible subset of the pixels of the image are changed; and
            the explanation map is such that, when input into the deep neural network for the classification:
                the explanation map does not lead to a same classification result as when the image is input into the deep neural network for the classification; and
                the explanation map does not cause an activation that exceeds an activation caused by the image in feature maps of the deep neural network.

2. The method as recited in claim 1, wherein the explanation map is selected in such a way that a loss function is optimized, the loss function having a first component, which characterizes how similar the explanation map is to the image, and/or having a second component, which characterizes how high a probability there is that the classification result which occurs for the explanation map corresponds to the classification result which occurs for the image.

3. The method as recited in claim 2, wherein the second component occurs area by area, pixel by pixel, due to a function which characterizes how much a particular pixel contributes to the classification result which occurs for the explanation map.

4. A method comprising:
    obtaining an image formed of a plurality of pixels, a subset of which are significant for a classification of the image ascertained using a deep neural network; and
    generating an explanation map of the image by changing all of the subset of the pixels, the generating of the explanation map being performed in such a way that:
        a smallest possible subset of the pixels of the image are changed;
        the explanation map does not lead to a same classification result as the image when the explanation map is supplied to the deep neural network for classification; and
        an activation caused by the explanation map does not exceed an activation caused by the image in feature maps of the deep neural network;
    wherein the generating of the explanation map includes optimizing a loss function including a first component that implements a condition that the activation by the explanation map does not exceed the activation caused by the image for at least one layer in the deep neural network, the is implementing of the condition being performed by penalizing an exceeding of the activation caused by the image.

5. A method comprising:
    obtaining an image formed of a plurality of pixels, a subset of which are significant for a classification of the image ascertained using a deep neural network; and
    generating an explanation map of the image by changing all of the subset of the pixels, the generating of the explanation map being performed in such a way that:
        a smallest possible subset of the pixels of the image are changed;
        the explanation map does not lead to a same classification result as the image when the explanation map is supplied to the deep neural network for classification; and
        an activation caused by the explanation map does not exceed an activation caused by the image in feature maps of the deep neural network;
    wherein the method includes a condition that the activation by the explanation map does not exceed the activation by the image, the condition being achieved by at least one of:
        setting the activation in the feature maps to a predefined maximum permissible value during the generating of the explanation map; and
        using a gradient-based optimization method in which a gradient of a backpropagation of a feature map of a layer of the deep neural network is set equal to a predefined gradient zero when the activation by the explanation map exceeds the activation by the image in the layer.

6. The method as recited in claim 5, wherein the condition is achieved by the using of the gradient-based optimization method in which the gradient of the backpropagation of the feature map of the layer of the deep neural network is set equal to the predefined gradient zero when the activation by the explanation map exceeds the activation by the image in the layer.

7. The method as recited in claim 1, the method further comprising:
    displaying the generated explanation map.

8. The method as recited in claim 7, further comprising:
    displaying the image next to the display of the generated explanation map.

9. A non-transitory machine-readable memory medium on which is stored a computer program that is executable by a computer and that, when executed by the computer, causing the computer to perform a method, the method comprising:
    obtaining an image formed of a plurality of pixels; and
    generating an explanation map of the image that maps at least one pixel region of the image that each is categorized as significant for a classification, by a deep neural network, of the image, wherein the generating of the explanation map is performed:
by using the deep neural network to, for each respective region of the at least one pixel region, change all of the pixels that are in the respective pixel region of the image; and
in such a way that:
a smallest possible subset of the pixels of the image are changed; and
the explanation map is such that, when input into the deep neural network for the classification:
the explanation map does not lead to a same classification result as when the image is input into the deep neural network for the classification; and
the explanation map does not cause an activation that exceeds an activation caused by the image in feature maps of the deep neural network.

10. A system comprising a processor, wherein the processor is configured to:
obtain an image formed of a plurality of pixels; and
generate an explanation map of the image that maps at least one pixel region of the image that each is categorized as significant for a classification, by a deep neural network, of the image, wherein the generation of the explanation map is performed:
by using the deep neural network to, for each respective region of the at least one pixel region, change all of the pixels that are in the respective pixel region of the image; and
in such a way that:
a smallest possible subset of the pixels of the image are changed; and
the explanation map is such that, when input into the deep neural network for the classification:
the explanation map does not lead to a same classification result as when the image is input into the deep neural network for the classification; and
the explanation map does not cause an activation that exceeds an activation caused by the image in feature maps of the deep neural network.

11. The system as recited in claim 10, the system further comprising:
a display interface, wherein the processor is configured to display the ascertained explanation map on the display interface.

12. The method as recited in claim 4, wherein the loss function additionally includes at least one of:
a second component that characterizes how similar the explanation map is to the image; and
a third component that characterizes how high a probability there is that the classification result that occurs for the explanation map corresponds to the classification result that occurs for the image.

13. The method as recited in claim 5, wherein the condition is achieved by the setting of the activation in the feature maps to the predefined maximum permissible value during the generating of the explanation map.

14. The method as recited in claim 13, wherein the generating of the explanation map includes optimizing a loss function, the loss function including at least one of:
a first component that characterizes how similar the explanation map is to the image; and
a second component that characterizes how high a probability there is that the classification result which occurs for the explanation map corresponds to the classification result which occurs for the image.

* * * * *